Jan. 12, 1926.　　　1,569,039
R. R. SCOGGAN
TROLLEY CONTACTOR
Filed March 13, 1923　　　2 Sheets-Sheet 1

Inventor
R. R. Scoggan
By C. A. Snow & Co.
Attorneys

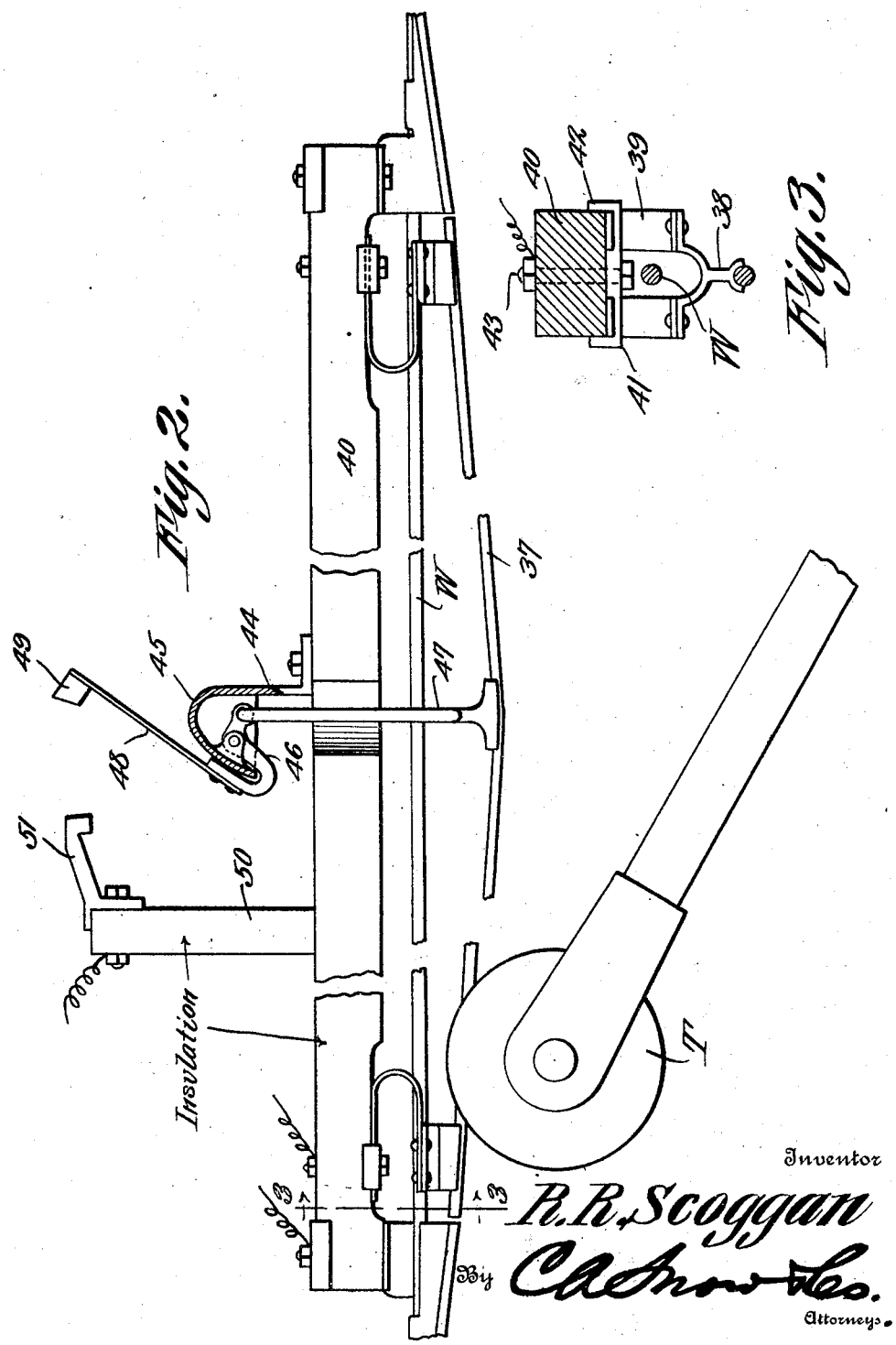

Patented Jan. 12, 1926.

1,569,039

UNITED STATES PATENT OFFICE.

RICHARD R. SCOGGAN, OF JEFFERSONVILLE, INDIANA.

TROLLEY CONTACTOR.

Application filed March 13, 1923. Serial No. 624,743.

*To all whom it may concern:*

Be it known that I, RICHARD R. SCOGGAN, a citizen of the United States, residing at Jeffersonville, in the county of Clark and State of Indiana, have invented a new and useful Trolley Contactor, of which the following is a specification.

This invention relates to a contactor for engagement by a trolley whereby the operation of various apparatus, such as switches, signals, and the like can be controlled by the passage of the trolley over the contactor.

Another object is to provide a contactor having a high degree of insulation between the parts, requiring no arc barriers, and having a novel construction that insures maximum wearing of the parts.

A further object is to provide a device of this character requiring only one run-way for the trolley wheel instead of two, said runway being capable of being operated by all trolley wheels, even those tilted far out of perpendicular or normal position.

Another object is to provide a contactor such as described which does not necessitate deflecting the trolley wire, and can be assembled with a trolley wire quickly between two cars, the insulated runway being continuous throughout and not divided.

With the foregoing and other objects in view which will appear as the description proceeds the invention consists of certain novel details of construction and combinations of parts which will be hereinafter more fully described and pointed out in the claims, it being understood that various changes may be made in the construction and arrangement of parts without departing from the spirit of the invention as claimed.

In the accompanying drawings the preferred forms of the invention have been shown.

In said drawings.

Figure 2 is a side elevation of a modified structure.

Figure 3 is a section on line 3—3 Figure 2.

Figure 1:
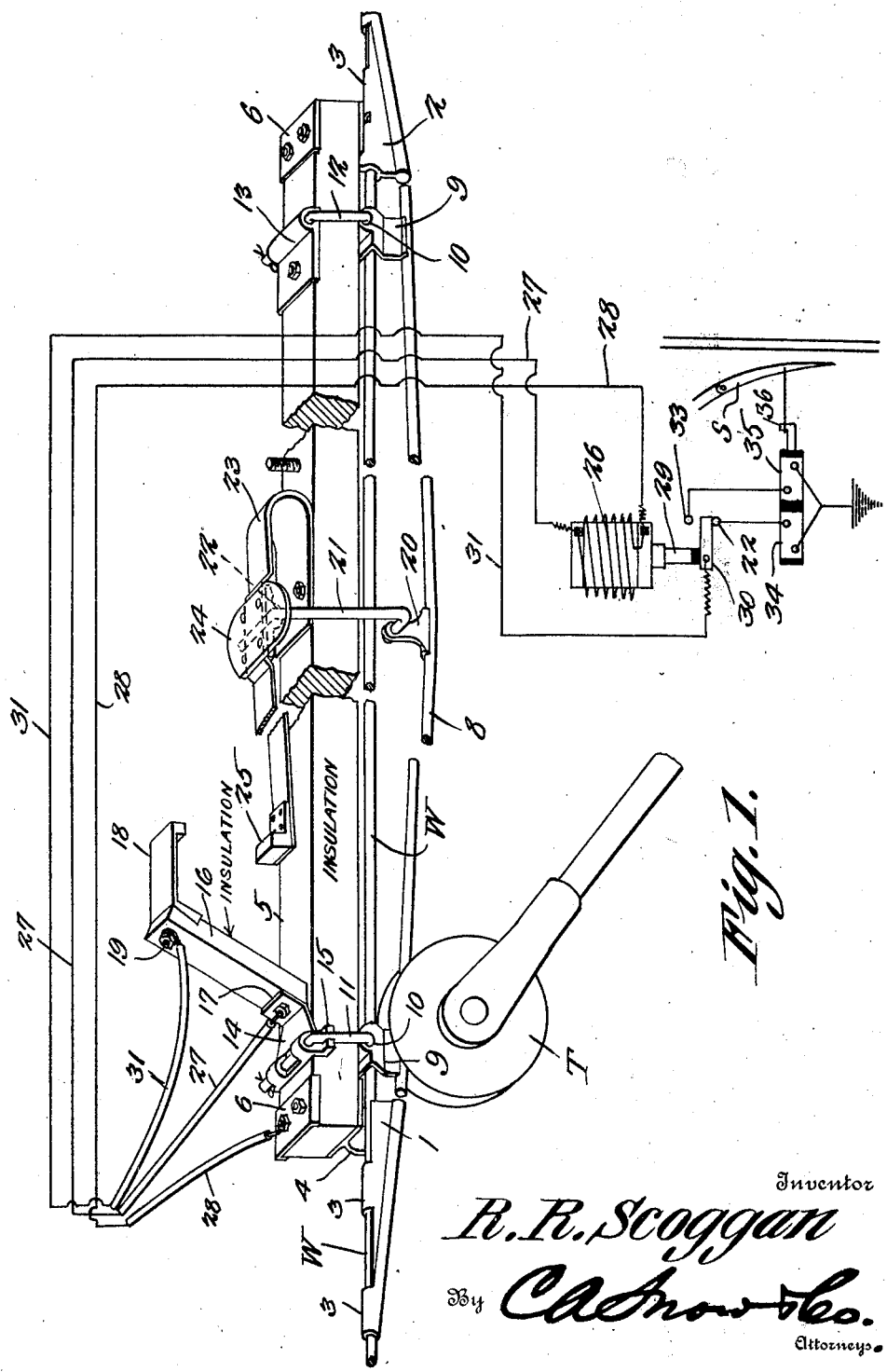
Figure 1 is a view partly in perspective and partly in diagram of one form of the invention.

Referring to the figures by characters of reference, 1 and 2 designate oppositely disposed, similar trolley wire ears having integral lips 3 clinched around the wire W. The large end of each ear has an upstanding T-shaped head 4, the web portion of which extends across one side of the trolley wire and resting on these heads 4 of the two ears are the ends of an angular wooden strip 5. Binding plates 6, preferably channeled, are mounted on the ends of the strip 5 and bolts 7 are extended through the heads 4, strip 5 and plates 6 for fastening them together.

Arranged between the ears 1 and 2 below wire W is a runway 8 formed of a flexible rod slightly bowed as shown, this runway being insulated from the wire W. To the ends of this rod are welded or otherwise suitably secured upwardly extending lugs 9 out of contact with the wire W and having their upper ends extended laterally between the wire W and the strip 5. These upper ends of the lugs are drilled at 10 to receive the lower ends of links 11 and 12 respectively. The link 12 constitutes a swinging support for one end of the rod 8, its upper end being journaled in a metal lug or plate 13 bolted on top of the strip 5. The upper end of link 11 is mounted in a lug or plate 14 bolted on strip 5, and a forked extension is provided at one side of the lug for straddling the link 11 and holding it rigid. This extension has been shown at 15.

Upstanding from and fixed relative to the strip 5 is a wooden arm 16 the lower portion of which is preferably secured to the upstanding end 17 of the lug or plate 14. A contact arm 18 extends from the top of the arm 16 and overhangs the strip 5. A bolt 19 connects the contact arm 18 to the wooden arm 16 and constitutes a binding post.

Welded or otherwise suitably connected to the middle portion of the rod 8 is an upstanding lug 20 to which is pivotally connected the lower end of a link 21. The upper end of the link is pivotally connected to a bearing lug 22 fastened to an intermediate portion of a spring arm 23 attached to the strip 5. A guard plate 24 is secured to the spring arm to protect the connection between the link 21 and the spring arm 23 from snow, ice and sleet. A contact 25 is provided at the free end of spring arm 23 and is normally spaced from but adapted to engage the contact arm 18.

The structure herein described is adapted to control the actuation of various mechanisms and, for the purposes of illustration, a switch operating mechanism has been shown in diagram electrically connected to the structure. This mechanism includes a master solenoid 26 one terminal of which is connected by a conductor 27 to the lug or plate 14 while the other terminal is connected by a conductor 28 to the plate 6 adjacent ear 1. The plunger or armature 29 of the solenoid carries a contact finger 30 insulated from the plunger and connected by a conductor 31 to the binding post 19 and contact arm 18. Finger 30 is supported between two contacts 32 and 33 electrically connected to separate solenoids 34 and 35 respectively. These solenoids can be grounded as shown and are adapted to work in opposition, one operating to move the bar or plunger 36 to the right and the other to move it to the left. This bar 36 can be connected to a switch S so as to shift it.

In practice it is designed to use a master solenoid 26 responsive, for example, to currents of twenty amperes or more while the solenoids 34 and 35 are responsive to currents of less than twenty amperes. When the motorman desires to keep a straight track he shuts off the power and allows the car to coast without current. When the trolley wheel T has advanced a short distance along the rod 8 it will lift the rod and thrust through link 21 against spring arm 23. Thus contact 25 will be brought against arm 18 and the following circuit will be established: beginning at ear 1 through connection 28 to the master solenoid 26 (which remains inactive because of the low amperage), then through the solenoid 26 and connection 27 to plate 14, link 11, lug 9, rod 8, lug 20, link 21, spring arm 23, contacts 25 and 18, conductor 31, finger 30, contact 32, solenoid 34 to ground. Thus the solenoid 34 will be energized and will draw in the bar 36.

When it is desired to turn out from the main track the motorman does not turn off the current to the motor as he approaches the contactor but uses the current of twenty five amperes or more required for driving the car. Thus it will be seen that when the wheel T contacts with the rod 8 and before the rod is raised thereby a current of approximately twenty five amperes starts from ear 1 through conductor 28 to solenoid 26 (which is thereby energized), and thence through conductor 27 to plate 14, link 11, and rod 8 to the trolley pole, car motors and ground. By thus energizing the solenoid 26 the finger 30 is shifted against contact 33 where it is held until the trolley wheel passes off of the rod 8. As the trolley wheel advances still further along rod 8 said rod will be elevated as hereinbefore described so as to bring the contact 25 against contact 18. Thus a circuit will be completed to the solenoid 35 over the path first described but by way of the contact 33 instead of contact 32. When solenoid 35 is thus energized the bar 36 will be operated to throw the switch and direct the car off of the main track and onto the siding or curve. As the wheel T approaches the ear 2 the rod 8 will be lowered so as to break the contact between 18 and 25 and shut off the low amperage current to the solenoid 35. While this circuit is being broken the magnet or solenoid 26 remains energized with finger 30 against contact 33. However, as soon as the trolley wheel passes off of the rod 8 the solenoid 26 becomes deenergized and the finger 30 drops onto the contact 32. It will be noted that with the construction described the finger 30 is raised before the current passes through it and does not start to descend until the current is cut off therefrom. It is to be understood, of course, that the parts can be rearranged to meet different requirements and, under some conditions, certain of the parts can be dispensed with.

One of the modified structures has been illustrated in Figures 2 and 3. In this form the runway 37 is provided near each end with a Y-shaped hanger 38 the upper ends of which are connected to leaf springs 39 substantially U-shaped. The upper ends of these springs are clamped to the bottom of the strip 40 by means of cross plates 41 having terminal ears 42 lapping the sides of the strip 40. A bolt 43 is extended upwardly through each plate 41 and the strip 40 and one of these bolts constitutes a terminal for one of the wires of the electrical apparatus hereinbefore mentioned. The springs 39 are spaced apart so that the wire W can pass between them.

Mounted on the strip 40 is a bracket 44 the upper end of which forms a protecting hood 45 and within this hood is pivotally mounted a bell crank 46. One arm of the bell crank is connected by a link 47 to the intermediate portion of the runway 37. The other arm of the bell crank is preferably U-shaped as shown and is provided with a spring arm 48 carrying a contact 49. An arm 50 of suitable insulating material is mounted on the strip 40 which is of a similar material and this arm has a contact arm 51 in the path of the contact 49.

It will be apparent that when the trolley wheel presses upwardly on the runway 37 the link 47 will thrust against the bell crank 46 and cause contact 49 to come against contact 51.

What is claimed is:

1. A device of the class described including an elongated insulating member for attachment to a trolley wire, a movably supported flexible run-way supported below said member, normally spaced contacts on the member, and means actuated by the pressure of a trolley wheel against the run-way for shifting one of the contacts against the other contact.

2. A device of the class described including an elongated insulating member for attachment to a trolley wire, a flexible run-way supported by and adapted to move relative to said member, separate circuit closing contacts supported by said member, ears connected to and projecting from the ends of the member for guiding a trolley wheel onto the run-way, and means actuated by the movement of the flexible run-way under the pressure of the trolley wheel for shifting one of the contacts to close a circuit through the contacts.

3. A device of the class described including an elongated insulating member, ears connected to and extending from the ends thereof for an attachment to a trolley wire, a flexible run-way movably supported between the ears and below said member, normally spaced contacts, and means actuated by the movement of the flexible run-way under pressure of the trolley wheel for bringing the contacts together.

4. A device of the class described including an elongated insulating member, ears connected to and projecting from the ends thereof for attachment to a trolley wire to support the member above the wire, a bowed run-way links for movably supporting the run-way from said member, normally spaced contacts, and means operated by the run-way under pressure from the trolley wheel of a car passing the run-way, for bringing the contacts together.

5. In a device of the class described the combination with an elongated insulating member, of ears connected to and extending from the ends of the member for attachment to a trolley wire, links suspended from said member, a run-way supported by the links between the ears, a fixed contact supported above said member, a movable contact on said member, and a connection between the run-way and the movable contact.

6. In a device of the class described the combination with an elongated insulating member, of ears connected to and extending from the ends of said member for attachment to a trolley wire, links suspended from the member, a run-way movably supported by the links between the ears, a contact supported by said member, an electrically operated member electrically connected to said contact and to the run-way, a movable contact supported by said member, and means operated by the run-way when subjected to pressure from a trolley wheel for shifting the movable contact against the first named contact, said means constituting an electrical connection between the movable contact and the run-way.

7. In a device of the class described an elongated insulating member, ears connected thereto and extending therefrom for attachment to a trolley wire, a flexible run-way movably supported from the insulating member between the ears, normally spaced fixed and movable contacts, means for transmitting motion from the flexible run-way to the movable contact to close the space between the contacts, an electrically operated member connected to the fixed contact and the movable contact respectively and electrically operated circuit controlling means electrically connected to one of the ears and to the flexible run-way.

8. The combination with an elongated insulating member and ears connected to and projecting from the ends thereof for attachment to a trolley wire, of a fixed contact connected to said member, a spring arm mounted on the member, a movable contact carried thereby, a flexible run-way movably connected to said member and supported between the ears, and means connecting the run-way to the spring arms for transmitting motion from the run-way to the arm to shift the contact on the arm against the fixed contact, said connecting means constituting an electrical connection between the spring arm and the run-way.

9. A device of the class described including an elongated insulating member for attachment to a torlley wire, a flexible insulated runway mounted below said member, normally spaced contacts on the member, and means actuated by the pressure of the trolley wheel against the runway for closing the contacts.

10. A device of the class described including an elongated insulating member for attachment to a trolley wire, a flexible insulated runway mounted below said member, and means for movably attaching both ends of the runway to the insulating member.

11. A device of the class described including an elongated insulating member for attachment to a trolley wire, an insulated flexible runway below said member, and a contacting member attached to the central portion of the flexible runway for closing and opening a circuit responsively to the pressure of a trolley wheel on the flexible runway.

12. A device of the class described including an elongated insulating member mounted above the trolley wire, and ears mounted beneath the trolley wire having T-shaped ends the web portions of which extend upwardly at one side of the trolley wire, the top portion of each T-shaped end forming a plate above the trolley wire on which the insulating member is mounted.

13. A device of the class described including an elongated insulating member for attachment to a trolley wire, a flexible insulated runway mounted below said member, the trolley engaging portion of which is of the same transverse area and proportions as the trolley wire, normally spaced contacts on the elongated insulating member, and means actuated by the pressure of the trolley wheel against the runway for closing these contacts.

In testimony that I claim the foregoing as my own, I have hereto affixed my signature.

RICHARD R. SCOGGAN.